Aug. 1, 1939.        A. M. MARKS        2,167,899
LIGHT POLARIZING DEVICE
Filed Dec. 11, 1937
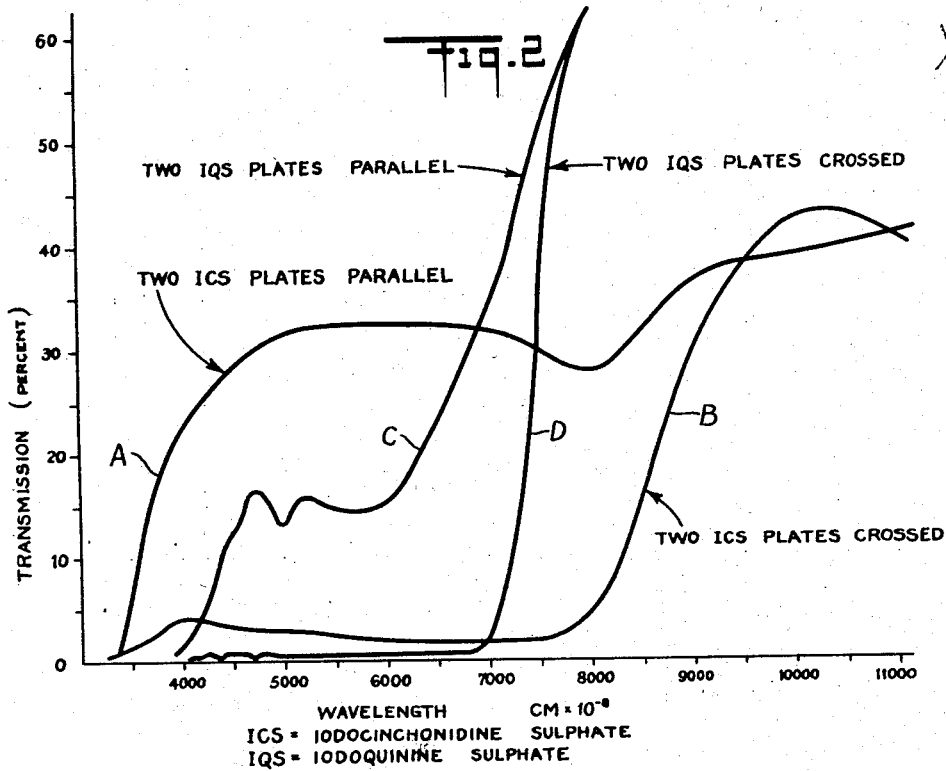
ICS = IODOCINCHONIDINE SULPHATE
IQS = IODOQUININE SULPHATE
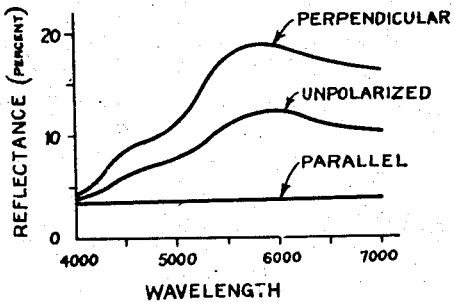
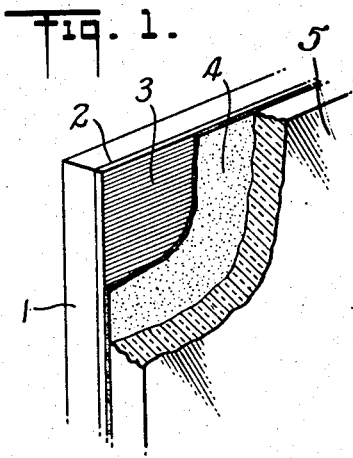
INVENTOR
*Alvin M. Marks*
BY
*Blair, Curtis, Dunne + Hayward*
ATTORNEYS Patented Aug. 1, 1939

2,167,899

UNITED STATES PATENT OFFICE 2,167,899

LIGHT POLARIZING DEVICE

Alvin M. Marks, Whitestone, N. Y.

Application December 11, 1937, Serial No. 179,296

4 Claims. (Cl. 88—65)

This invention relates to light polarizing means.

One of the objects of the invention is to provide an improved device for polarizing light or for use as an analyzer in connection with light already polarized.

This application is a continuation in part of my copending application Serial No. 662,090, filed March 22, 1933, now issued as Patent No. 2,104,949.

In the accompanying drawing:

Figure 1 is a diagrammatic perspective view of a polarizing device embodying the present invention;

Figure 2 is a graph comparing the characteristics of a light polarizer having as its polarizing medium iodocinchonidine sulphate and embodying the present invention with a light polarizer having iodoquinine sulphate for its polarizing medium; and Figure 3 is a graph showing the percent of polarization of light reflected from a polarizer embodying this invention.

Referring to Figure 1, the light polarizing or analyzing device shown as one embodiment of the invention comprises a supporting medium 1 having a supporting surface 2, supporting a crystalline structure 3 of iodocinchonidine sulphate, and a protecting layer 4 of non-reactive lacquer over the crystalline structure. The lacquer protects the iodocinchonidine sulphate from atmospheric deterioration, from loss of iodine and water, and makes possible the handling and cutting of the support without injury to the crystalline layer. Over the coating 4 a protective cover plate 5 may be cemented to protect further the crystalline layer 3.

The surface 2 is made or held sufficiently rigid or non-flexible to support the crystalline structure without permitting such flexing as would break the crystalline structure.

The crystalline structure is of the type produced by depositing the iodocinchonidine sulphate on the supporting surface in the manner described in the said application Serial No. 662,090, which is briefly as follows: If the supporting medium is a glass plate, the surface is thoroughly cleaned and dipped into a solution of the iodocinchonidine sulphate in alcohol, maintaining the surface of the glass substantially normal to the surface of the solution. The surface of the solution is then moved downwardly with respect to the glass plate, and at the same time the alcohol is evaporated causing the iodocinchonidine sulphate to crystallize out on the supporting surface. This crystallization is controlled to form a substantially continuous, substantially optically uniform crystalline structure which polarizes incident light without dispersion or diffusion. This crystalline layer behaves as a single crystal.

The iodocinchonidine sulphate may be made as described in the said application Serial No. 662,090 and is preferably the iodocinchonidine sulphate—$a$. I mention this because apparently iodocinchonidine sulphate exists in several forms, one of which, the $a$ form, when crystallized in the usual way from the solution, tends to form flat, almost symmetrical, hexagonal or other shapes derived from an approximately 44° rhombic crystal. When of the proper thickness, the extinction color of this crystal is practically black when two of them are crossed, but in a powerful light, especially when the crystal film is thin, the color is blue-black and its color when passing light is practically colorless.

When following the process described in the application Serial No. 662,090, the $a$ form is obtained, and this form when dissolved in the coating solution may then be coated onto the supporting surface.

The iodocinchonidine sulphate, when coated on a supporting surface in this manner is in a stable form and is in contact with sterile media only, whereas iodocinchonidine sulphate in a finely dispersed or colloidal form, especially when in contact with plasticizers and solvents and supported in a cellulose base medium is unstable and changes its form, losing its polarizing property.

A light polarizing device embodying the invention has definite advantages over a light polarizer employing iodoquinine sulphate as the polarizing medium. In Figure 2, curves are shown, the shapes of which are representative of light polarizers embodying the invention and light polarizers using iodoquinine sulphate. Curves A and B show, respectively, the light transmission characteristics of two iodocinchonidine sulphate plates parallel and two iodocinchonidine sulphate plates crossed. Curves C and D show, respectively, the light transmission characteristics of two iodoquinine sulphate plates parallel and two iodoquinine sulphate plates crossed. Note that the curves A and B show that the light is polarized more uniformly throughout the visible spectrum and also that on parallel transmission, the iodocinchonidine sulphate plates pass all rays of the visible spectrum more uniformly. Thus, the iodocinchonidine sulphate polarizer is more colorless on parallel transmission and is more nearly black on extinction.

Further, the iodocinchonidine sulphate polarizer polarizes effectively from the ultra violet (3750 Å) to the infra red (8500 Å). Further, in the red and infra red region, iodocinchonidine sulphate polarizes partly by reflection, so that comparatively little heat energy is absorbed by the polarizing device. Thus, this plate may be used in connection with search lights or other powerful light sources without over-heating.

The iodocinchonidine sulphate polarizer embodying the invention, being in the form of a crystalline layer, is sufficiently smooth and continuous to reflect light as does a mirror. This has the following advantage: The polarization of light passing through a polarizer occurs simultaneously in two ways. At the surface of the crystalline layer, the light is split into two oppositely polarized beams, one, a transmitted beam and the other a regularly reflected beam. Both beams are strongly polarized for all angles of incidence of a beam of ordinary light from zero to normal incidence, inclusive. The transmitted beam is polarized in a direction at right angles to that of the reflected beam.

At the surface of an isotropic medium such as glass, the light at zero and normal incidence shows no polarization in the reflected and transmitted beams and the maximum polarization is reached at some particular angle, usually $57\frac{1}{2}°$ for glass. However, the polarization of the reflected and transmitted light rays through the polarizers embodying the present invention is equally effective at all angles of incidence. This kind of light polarization enables the polarizing plate to be useful in many new ways.

Referring to Figure 3, wherein percent reflection values representative of polarizing plates embodying the invention are shown, the curve marked "parallel" shows the percent of incident light reflected when the incident light is polarized in a plane that is the same as the plane of polarization of the polarizing plate. The curve marked "unpolarized" shows the percent of light that is reflected and polarized when the incident light is itself unpolarized. The curve marked "perpendicular" shows the percent reflection when the plane of polarization of the incident light is at 90° to the plane of polarization of the polarizing plate. The light thus reflected in the parallel position may or may not be polarized and is primarily due to the reflection of the glass surface on which the film is mounted.

In studying these curves, it is evident that all but a very small percent of the light reflected from the surface of the film is polarized. Furthermore, this light is polarized independent of the angle of incidence.

The continuous nature of the light polarizing layer of the polarizer of the invention has advantages which make this polarizer useful in many fields where other polarizers are not suitable. For example, in photography, the high transmission, completeness of polarizing, and wide range of spectral transmission, together with the freedom from light-scattering and freedom from refractive errors make this polarizer highly efficient.

As various embodiments might be made of this invention, and as various changes might be made in the construction herein described, all without departing from the scope of the invention, it is to be understood that all matter herein set forth or shown in the accompanying drawing is to be interpreted as illustrative and not in a limiting sense.

I claim:

1. A light polarizing device, comprising, a supporting medium having a surface coated with iodocinchonidine sulphate, said coating comprising a substantially continuous crystalline layer directly crystallized on the surface from solution and forming effectively a single crystal of substantially uniform optical orientation whereby the iodocinchonidine sulphate is so arranged that for each unit surface area a maximum amount of ordinary incident light is transmitted, and a maximum amount of the transmitted light is polarized per unit of thickness for the iodocinchonidine sulphate.

2. An article of manufacture, comprising, a supporting medium having a surface coated with iodocinchonidine sulphate in the form of a continuous crystalline layer directly crystallized thereon from solution and forming effectively a single crystal of substantially uniform optical orientation.

3. An article of manufacture, comprising, a supporting medium having a surface coated with iodocinchonidine sulphate in the form of a continuous crystalline layer directly crystallized thereon from solution and forming effectively a single crystal of substantially uniform optical orientation, said layer being capable of reflecting incident light and of polarizing said incident light independently of the angle of incidence.

4. An article of manufacture, comprising, a supporting medium having a surface coated with iodocinchonidine sulphate in the form of a continuous crystalline layer directly crystallized thereon from solution and forming effectively a single crystal of substantially uniform optical orientation, said layer being capable of splitting incident light into a polarized transmitted beam and a polarized reflected beam polarized at right angles to the plane of polarization of the transmitted beam.

ALVIN M. MARKS.